(12) United States Patent
Jang et al.

(10) Patent No.: US 8,483,749 B2
(45) Date of Patent: Jul. 9, 2013

(54) MOBILE TERMINAL DEVICE FOR RECEIVING DUAL BAND SIGNAL USING MULTIPLE RESONANCE ANTENNA

(75) Inventors: Kwang Seok Jang, Suwon-si (KR); Dae Chul Kang, Hwaseong-si (KR); Jae Ho Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/291,575

(22) Filed: Nov. 8, 2011

(65) Prior Publication Data
US 2012/0122522 A1 May 17, 2012

(30) Foreign Application Priority Data

Nov. 11, 2010 (KR) .................. 10-2010-0111961

(51) Int. Cl.
*H04M 1/00* (2006.01)
(52) U.S. Cl.
USPC ...... 455/550.1; 455/323; 455/334; 455/575.7
(58) Field of Classification Search
USPC ............. 455/90.3, 188, 313, 323, 334, 339, 455/550.1, 552.1, 575.1, 575.2, 575.7
See application file for complete search history.

(56) References Cited

U.S. PATENT DOCUMENTS

| | | | |
|---|---|---|---|
| 6,452,556 B1* | 9/2002 | Ha et al. | 343/702 |
| 7,706,766 B2* | 4/2010 | Vavelidis et al. | 455/234.1 |
| 2004/0166909 A1* | 8/2004 | Lee | 455/575.7 |
| 2011/0044414 A1* | 2/2011 | Li | 375/350 |

FOREIGN PATENT DOCUMENTS

| | | |
|---|---|---|
| KR | 10-2007-0080906 A | 8/2007 |
| KR | 10-0879261 B1 | 1/2009 |

* cited by examiner

*Primary Examiner* — Nhan Le
(74) *Attorney, Agent, or Firm* — Jefferson IP Law, LLP (57) ABSTRACT

A mobile terminal device for receiving a dual band signal using a multiple resonance antenna in a mobile terminal is provided. The mobile terminal device includes a multiple resonance antenna, a first band filter connecting with the multiple resonance antenna, for filtering a first band signal of a low band received through the multiple resonance antenna, a second band filter connecting with the multiple resonance antenna, for filtering a second band signal of a high band received through the multiple resonance antenna, and a signal processor including a first signal processing unit for converting a frequency of the first band signal to generate a first baseband signal and a second signal processing unit for converting a frequency of the second band signal to generate a second baseband signal, and for activating a corresponding signal processing unit according to selection of a user.

18 Claims, 12 Drawing Sheets

MOBILE TERMINAL DEVICE FOR RECEIVING DUAL BAND SIGNAL USING MULTIPLE RESONANCE ANTENNA

PRIORITY

This application claims the benefit under 35 U.S.C. §119 (a) of a Korean patent application filed on Nov. 11, 2010 in the Korean Intellectual Property Office and assigned Serial No. 10-2010-0111961, the entire disclosure of which is hereby incorporated by reference.

BACKGROUND OF THE INVENTION

1. Field of the Invention

The present invention relates to a mobile terminal device. More particularly, the present invention relates to a device for receiving a dual band signal using a multiple resonance antenna in a mobile terminal.

2. Description of the Related Art

In recent years, in the trend of digital convergence, antennas for portable broadcasting (e.g., Terrestrial-Digital Multimedia Broadcasting (T-DMB), Satellite-DMB (S-DMB), and the like), a Global Positioning System (GPS) and Connectivity (e.g., Bluetooth, Radio Frequency Identification (RFID), Near Field Communication (NFC), Zigbee, Ultra WideBand (UWB), Electronic Fee Collection (EFC)), as well as mobile communication antennas for $2^{nd}$ Generation (2G) (e.g., Code Division Multiple Access (CDMA), a Personal Communication Service (PCS), and the like), and $3^{rd}$ Generation (3G) (e.g., Wideband CDMA (WCDMA), PCS, Data Communication Services (DCS), Global System for Mobile communications (GSM), and the like) are simultaneously implemented in a mobile phone.

The foregoing mobile terminal may include a plurality of antennas to support various communication functions. For example, a DMB receiver may receive both T-DMB and S-DMB. In this case, an antenna for a T-DMB is configured by a retractable type, a removable type, or an earphone integral type. Because an antenna for S-DMB is different from that used by T-DMB, there is a need for two antennas. In a case of a mobile terminal including a DMB function, because a frequency in the T-DMB is low, the wavelength is long, which results in a need for a long antenna. On the other hand, due to a high frequency in an S-DMB, the wavelength is short, which results in a need for a short antenna. Furthermore, the mobile terminal receiving Frequency Modulation (FM) and performing a Wi-Fi communication function requires two antennas. Accordingly, in a mobile terminal including a plurality of communication functions, as the number of antennas is increased, the mounting space and cost of a component are also increased. Accordingly, because a plurality of antennas should be installed in the mobile terminal, the sensitivity of a received signal is influenced according to a gripping location of the user. As a result, a location of an antenna mounted in the mobile terminal should be considered.

For example, in a case of a DMB phone, because a frequency in the T-DMB is low, the wavelength is long, which results in a need for a long antenna. On the other hand, due to a high frequency in an S-DMB, the wavelength is short, which results in a need for two short diversity antennas. As previously illustrated, increasing the number of antennas in the mobile terminal also increases component mounting space and cost of the mobile terminal. There have been many restrictions on performance and arrangement of antennas in a slim mobile terminal due to implementation of a multiple antenna. For example, there is a restriction on separate arrangement of antennas at an upper part and a lower part of a mobile terminal in consideration of receiving performance according to a grip of a user.

Therefore, a need exists for a device for receiving a dual band signal using multiple resonance antennas in a mobile terminal.

SUMMARY OF THE INVENTION

Aspects of the present invention are to address the above-mentioned problems and/or disadvantages and to provide at least the advantages described below. Accordingly, an aspect of the present invention is to provide a device for receiving a dual band signal using multiple resonance antennas in a mobile terminal.

Another aspect of the present invention is to provide a mobile terminal for processing a multiple band signal through multiple resonance antennas, in which the multiple resonance antennas are configured to share another frequency band path by an antenna receiving a specific frequency band signal.

An exemplary embodiment of the present invention includes an antenna having a long length (namely, receiving a lower band frequency), an integral antenna, an attaching antenna, and an earphone-antenna and includes an antenna having a short length (namely, receiving a higher band frequency) by multiple resonance antennas, shares a reception path of two antennas, and receives and processes a multiple band signal for a mobile terminal In this case, the number of antennas in the mobile terminal is reduced, thereby simplifying space security for installing the antennas such that the antennas may be arranged in consideration with a grip of a user when watching Digital Multimedia Broadcasting (DMB).

Furthermore, an exemplary embodiment of the present invention implements a receiving antenna in a mobile terminal including a Multiple-Input Multiple-Output (MIMO) antenna or a Multiple-Input Single-Output (MISO) antenna by a multiple resonance antenna. That is, an exemplary embodiment of the present invention may include a multiple resonance antenna in a mobile terminal including an antenna for transmitting and receiving a specific band frequency (e.g., Wi-Fi, etc.), and for processing a specific band frequency received through the multiple resonance antenna as a second input.

In accordance with an aspect of the present invention, a mobile terminal device is provided. The mobile terminal device includes a multiple resonance antenna, a first band filter connecting with the multiple resonance antenna, for filtering a first band signal of a low band received through the multiple resonance antenna, a second band filter connecting with the multiple resonance antenna, for filtering a second band signal of a high band received through the multiple resonance antenna, and a signal processor including a first signal processing unit for converting a frequency of the first band signal to generate a first baseband signal and a second signal processing unit for converting a frequency of the second band signal to generate a second baseband signal, and for activating a corresponding signal processing unit according to selection of a user.

In accordance with another aspect of the present invention, a mobile terminal device is provided. The mobile terminal device includes a multiple resonance antenna including integrally configured first and second antennas, a first band filter connecting with the multiple resonance antenna, for filtering a first band signal of a low band received through the multiple resonance antenna, a second band filter connecting with the multiple resonance antenna, for filtering a second band signal of a high band received through the multiple resonance antenna, a main antenna, a signal processor for converting a frequency of a second band signal received through the main antenna to generate a baseband signal, for converting a frequency of the first band signal received through the multiple resonance antenna to generate a baseband signal, and for converting a frequency of the second band signal to generate a baseband signal, and a controller for detecting connection of the multiple resonance antenna when a multi-input processing function is selected, and for demultiplexing the second band signals generated by the signal processor when connection of the multiple resonance antenna is detected.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A multiple resonance antenna, according to an exemplary embodiment of the present invention, is configured by an integral antenna, an external antenna, and an earphone-antenna. In this case, the integral and external antennas may be a center loading helical antenna, and the earphone antenna may be a micro-Universal Serial Bus (USB) or a T20 pin connector. Furthermore, the multiple resonance antenna may be an antenna receiving Terrestrial-Digital Multimedia Broadcasting (T-DMB)/Satellite-DMB (S-DMB) signals. In this case, an application of the internal, external, and earphone antennas may be an antenna for receiving terrestrial & satellite interference (gap filler receiving antenna). However, a method for processing a multiple band signal using a multiple resonance antenna is applicable to radio Frequency Modulation (FM)/satellite DMB, T-DMB/Wi-Fi, T-DMB/Global Positioning System (GPS), FM/Wi-Fi, FM/GPS, and China Mobile Multimedia Broadcasting (CMMB)/GPS. Another exemplary embodiment of the present invention suggests a multiple resonance antenna of a mobile terminal having a Multiple-Input Multiple-Output (MIMO) or a Multiple-Input Single-Output (MISO) function. In this case, the mobile terminal may include a main antenna for transmitting and receiving a Wi-Fi signal and an auxiliary antenna being a multiple resonance antenna for receiving FM/Wi-Fi signals. In an exemplary implementation, a Wi-Fi signal may be received through the main antenna and the auxiliary antenna when downloading data.

A mobile terminal device, according to an exemplary embodiment of the present invention, may include a multiple resonance antenna, a first band filter connected to the multiple resonance antenna for filtering a first band signal of low band received through the multiple resonance antenna, a second band filter connected to the multiple resonance antenna for filtering a second band signal of high band received through the multiple resonance antenna, and a signal processor including a first signal processing unit for converting a frequency of the first band signal to generate a baseband signal, and a second signal processing unit for converting a frequency of the second band signal to generate a baseband signal, and for activating a corresponding signal processing unit according to selection of a user.

In this case, the multiple resonance antenna is one of integral, external, and earphone-antennas, and may be configured by a first antenna for receiving the first band signal and a second antenna for receiving the second band signal. The second antenna has a λ/4 or λ/2 length of the second band signal.

In a first exemplary embodiment of the present invention, first band is a T-DMB band, and the second band is an S-DMB band. In this case, the first antenna receives a T-DMB band signal, the second antenna receives an S-DMB band signal, the first band filter is a low pass filter for receiving the T-DMB band signal, and the second band filter is a high pass filter for receiving an S-DMB band signal. Furthermore, the second antenna receiving an S-DMB signal may include two antennas. A second antenna being a remaining one antenna is installed at another side of a terminal device in which a multiple resonance antenna is installed to minimize influence according to a grip of a user.

Furthermore, in a second exemplary embodiment of the present invention, the first band is an FM band, and the second band is a Wi-Fi band. In this case, an antenna of the mobile terminal includes a main antenna for receiving Wi-Fi and an auxiliary antenna being a multiple resonance antenna.

The first antenna of the auxiliary antenna receives an FM band signal, the second antenna receives a Wi-Fi band signal, the first band filter is a low pass filter for receiving the FM band signal, and the second band filter is a high pass filter for receiving a Wi-Fi band signal. That is, the antenna receiving the Wi-Fi signal is configured by two antennas (i.e., main and auxiliary antennas). A remaining one antenna (main antenna) may be installed at another side of a terminal device in which the multiple resonance antenna is installed to minimize influence according to a grip of a user.

Hereinafter, an operation of a mobile terminal, according to an exemplary embodiment of the present invention, having a construction and characteristics as mentioned above will be described.

FIGS. 1 through 4, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1A:
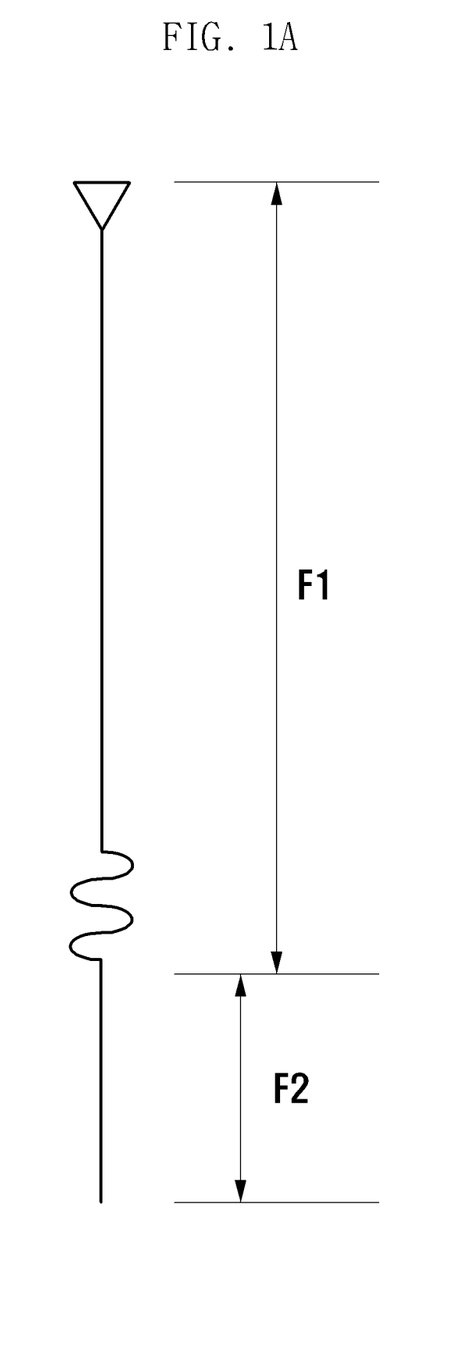
FIG. 1A illustrates multiple frequencies F1 and F2 received through a multiple antenna according to an exemplary embodiment of the present invention.
Figure 1B:
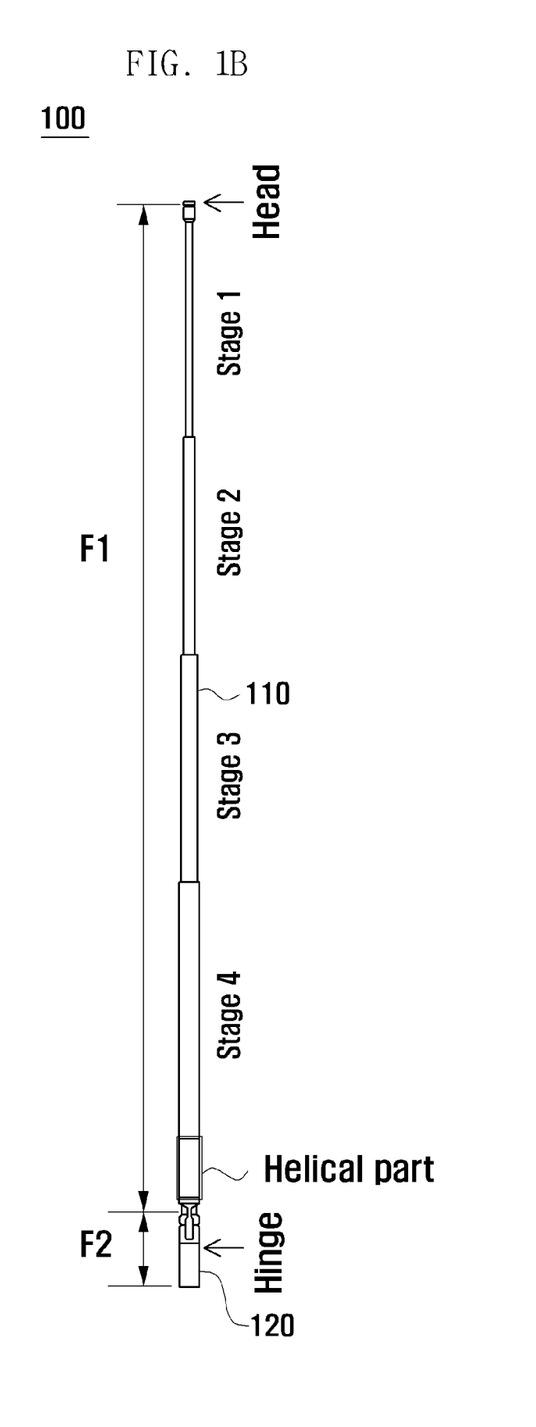
FIG. 1B illustrates a structure of an internal multiple resonance antenna according to an exemplary embodiment of the present invention.
Figure 1C:
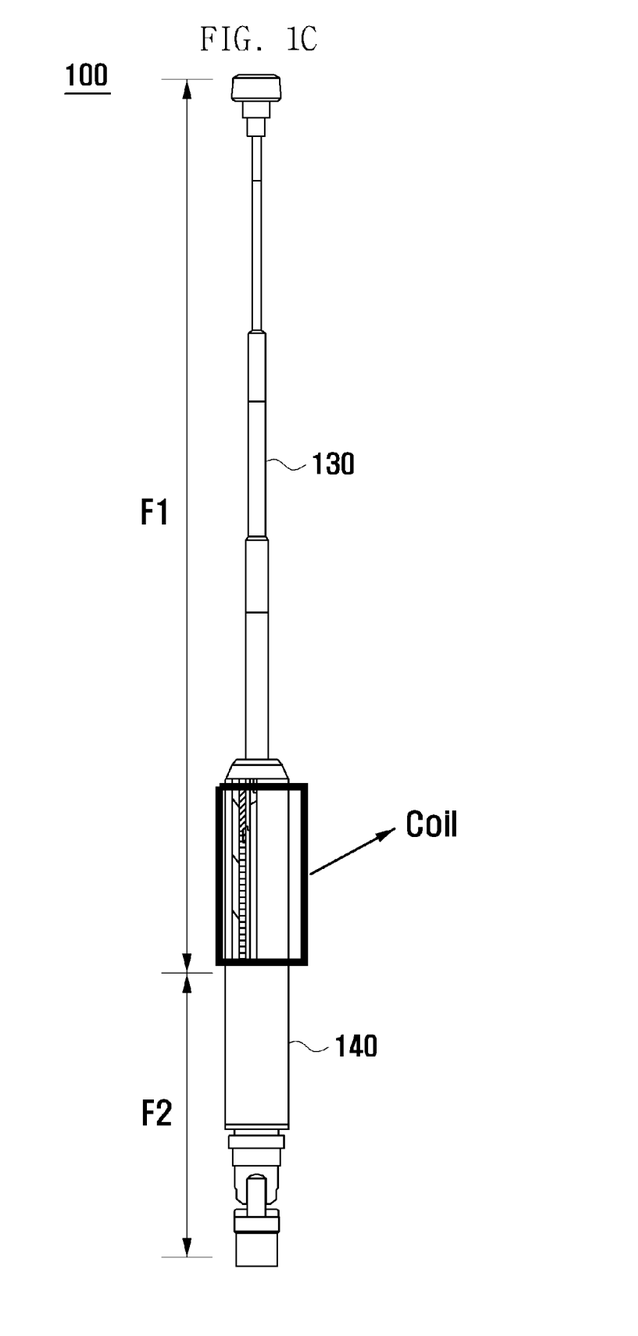
FIG. 1C illustrates a structure of an external multiple resonance antenna according to an exemplary embodiment of the present invention.
Figure 1D:
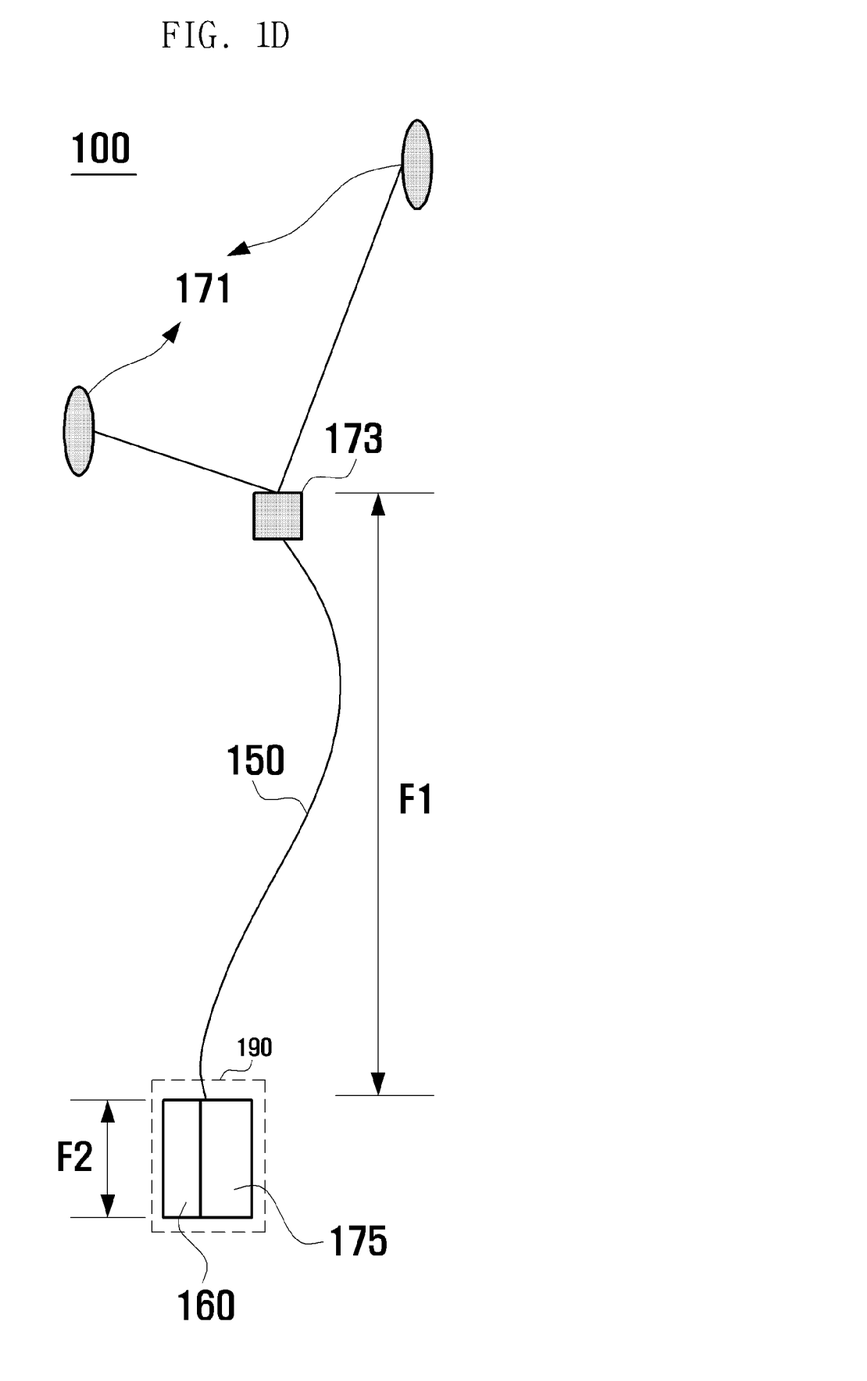
FIG. 1D illustrates a structure of a multiple resonance antenna for an earphone according to an exemplary embodiment of the present invention.

FIG. 1A illustrates multiple frequencies F1 and F2 received through a multiple antenna according to an exemplary embodiment of the present invention, FIG. 1B illustrates a structure of an internal multiple resonance antenna according to an exemplary embodiment of the present invention, FIG. 1C illustrates a structure of an external multiple resonance antenna according to an exemplary embodiment of the present invention, and FIG. 1D illustrates a structure of a multiple resonance antenna for an earphone according to an exemplary embodiment of the present invention.

Referring to FIG. 1A, an antenna includes a first antenna for receiving a frequency F1 and a second antenna for receiving a frequency F2, wherein F2 is higher than F1.

Referring to FIG. 1B, a structure of a center loading helical antenna is illustrated. In this case, it is set that a first antenna 110 receiving the F1 frequency has a λ/4 or λ/2 length of the F1 frequency, and a second antenna 120 receiving the F2 frequency has a λ/4 or λ/2 length of the F2 frequency. Furthermore, a boundary location of the first antenna 110 and the second antenna 120 becomes a feeding point. Accordingly, the first antenna 110 and the second antenna 120 connect with a feeding line of the terminal device through the feeding point, and receive corresponding F1 and F2 frequency band signals, respectively. In a case of the internal antenna, the first antenna 110 is configured by a folded type (i.e., four stages in FIG. 1B), and may be installed inside the terminal device, and be extended to an exterior by a user if necessary. The second antenna 120 has a structure that is located inside the terminal device.

Referring to FIG. 1C, an external antenna may be completely spaced apart from the terminal device. If necessary, the external antenna has a structure combined with the terminal device. Furthermore, the external antenna may have a helical antenna structure. In this case, a feeding point and the feeding scheme may be performed in the same way as that of the internal antenna of FIG. 1B. It is set in FIG. 1C that a first antenna 130 for receiving the frequency F1 has the λ/4 or λ/2 length of the F1 frequency, and a second antenna 140 for receiving an F2 frequency has the λ/4 or λ/2 length of the F2 frequency. The multiple resonance antenna having a structure as illustrated in FIGS. 1B and 1C exclusively uses a current F1 signal. However, if filters separating multiple frequency signals in the terminal device and a frequency to be processed are selected, a multiple frequency may be shared.

Referring to FIG. 1D, a first antenna 150 may become a wire antenna connected between an earphone 171 and a connector 190, which is installed separately from an audio line. In this case, the first antenna 150 may be made of copper as a conductor. The connector 190 connects with a connector of the mobile terminal, and performs a function of connecting an earphone to the mobile terminal. In this case, the connector 190 may be configured by a plug connector and the terminal may include a socket connector. The connector 190 may have a Radio Frequency (RF) filter therein, and the RF filter connects with the first antenna 150 and filters an F1 band signal but restrains other band signals. In this case, the RF filter may be configured by a low pass filter or a band pass filter for filtering an F1 band signal. The RF filter passes the F1 band signal but restrains an F2 band signal. An output of the RF filter is transferred to a terminal device through an internal path of a connector coupler (i.e., plug connector) 175. In this case, the path may be a Printed Circuit Board (PCB) pattern as a conductor, which may be implemented by a micro-strip line.

A second antenna 160 is installed inside the connector 190, which connects with the connector coupler 175. The second antenna 160 receives an F2 band signal, and a signal received through the second antenna 160 is provided to the mobile terminal through the connector coupler 175. In this case, the second antenna 160 may be configured in the form of a coil Antenna (ANT), a wire ANT, or a pattern ANT, and the length of the antenna is a λ/4 or λ/2 of a frequency F2.

As illustrated above, an earphone antenna may include a second antenna 160 inside the connector 190. The F1 and F2 signals are separated by an RF filter located inside the connector 190 and transferred to the terminal device. That is, in the signal received through the first antenna 150, a signal of another frequency band is restrained but only a signal of F1 band is passed and transferred to the connector coupler 175, and the second antenna 160 transfers a signal of an F2 band signal to the connector coupler 175. Accordingly, the connector 190 transfers F1 and F2 signals received through the first antenna 150 and the second antenna 160 to the terminal device. In this case, the connector 190 may include a micro USB or a T20 pin connector.

Figure 2:
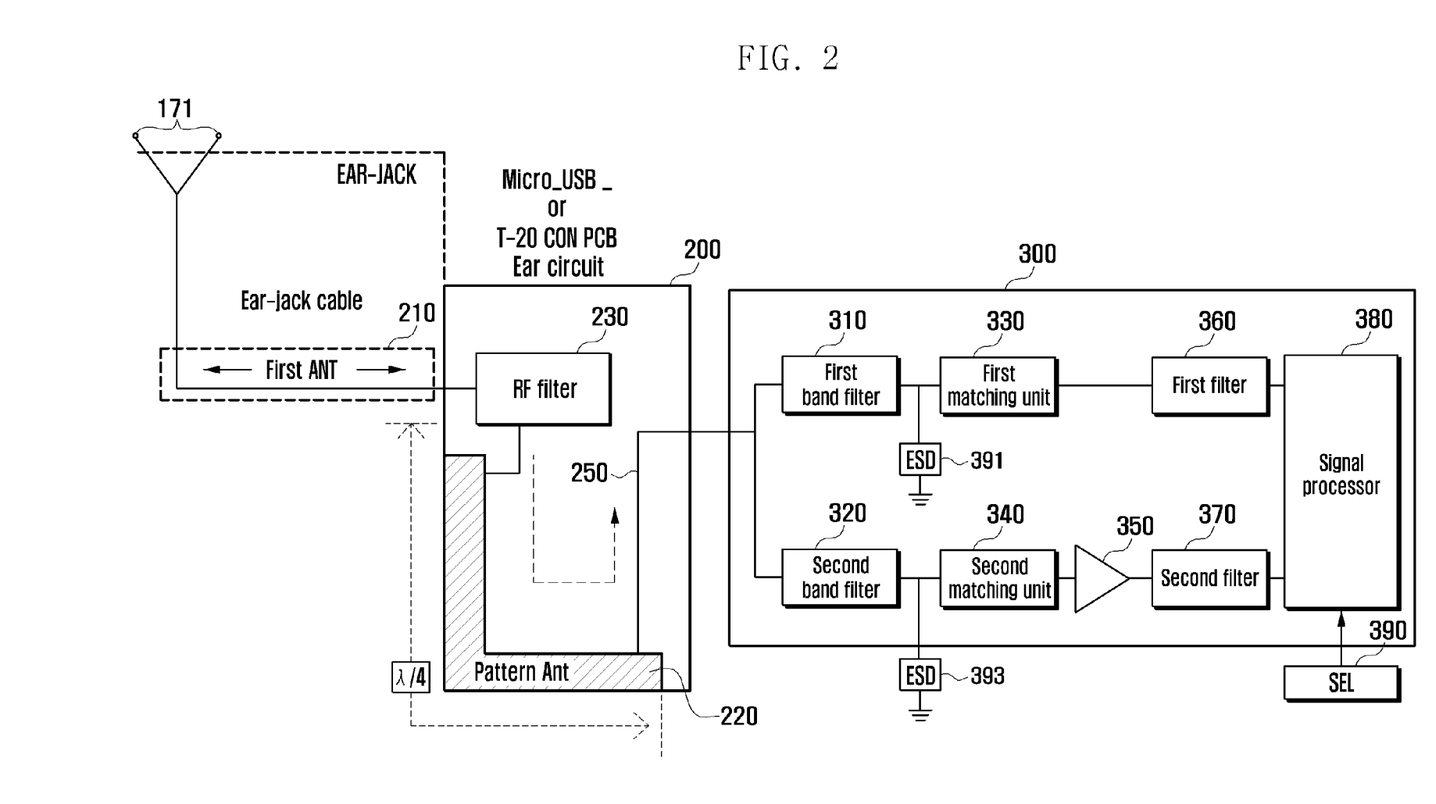
FIG. 2 is a block diagram illustrating a configuration of a terminal device using a multiple resonance antenna according to an exemplary embodiment of the present invention.

FIG. 2 is a block diagram illustrating a configuration of a terminal device using a multiple resonance antenna according to an exemplary embodiment of the present invention.

Referring to FIG. 2, the multiple resonance antenna may be an antenna for receiving T-DMB/S-DMB signals. The frequency F1 may be 174 MHz-212 MHz, which is a T-DMB frequency and a frequency F2 may be 2642 MHz, which is an S-DMB frequency. Referring to FIG. 2, the antenna 100 may be one of an integral antenna of FIG. 1B, an external antenna of FIG. 1C, or a multiple resonance antenna for an earphone of FIG. 1D. In this case, first antennas 110, 130, and 150 may be an antenna for receiving F1: 174 MHz-212 MHz of the T-DMB band, and the second antennas 120, 140, and 160 may be an antenna for receiving F2: 2642 MHz, 2.64 GHz of the S-DMB band. Referring to FIG. 2, the antenna 100 may be an earphone antenna.

A second antenna 220 for receiving an S-DMB signal of a second band frequency is configured in the form of an S-DMB pattern ANT located between an RF filter 230 and a path 250 on an internal PCB of an antenna connector 200, and is designed to have a $\lambda/2$ length or a $\lambda/4$ length in an S-DMB band of a second band frequency. That is, the S-DMB antenna 220 is designed to have a characteristic that restrains a T-DMB band signal but passes an S-DMB band signal (i.e., $Z=50\Omega@$ 2642 MHz, Z=open @ 174 MHz-212 MHz).

Accordingly, the earphone antenna device receives a first band frequency through a first antenna in the form of a wire located outside the antenna connector 200. If a signal except for the first band frequency in the RF filter 230 is restrained, the first band frequency is transferred to the path 250. A second band frequency received through the second antenna 220 located inside the antenna connector 200 is transferred to a path 250. The first and second band frequencies transferred to the path 250 are provided to a mobile terminal 300. Accordingly, a first band filter 310 of the mobile terminal 300 filters an F1 band signal from a signal received from the earphone antenna, and a second band filter 320 filters an F2 band signal from a signal received from the earphone antenna. That is, the first band filter 310 filters an F1 signal received through a first antenna 210 of the earphone antenna and the second band filter 320 filters an F2 signal received through a second antenna 220 of the earphone antenna. In this case, the F1 band may become a T-DMB band and the F2 band may become an S-DMB band. As shown in FIG. 2, the first band filter 310 may be configured by a low pass filter and the second band filter 320 may be configured by a high pass filter. That is, the first band filter 310 may be configured by a low pass filter for extracting a frequency band signal including the T-DMB signal, and the second band filter 320 may be configured by a high pass filter for extracting a frequency band signal including the S-DMB signal.

An Electrostatic Discharge (ESD) unit 391 connects with an output terminal of the first band filter 310 and restrains a surge of the F1 signal. A first matching unit 330 matches impedance of a signal output from the first band filter 310. A first filter 360 filters an F1 band signal from a signal output from the first matching unit 330. Furthermore, an ESD unit 393 connects with an output terminal of a second band filter 320, and restrains a surge of the F2 band signal. A second matching unit 340 matches impedance of a signal output from the second band filter 220. A Low Noise Amplifier (LNA) 350 low-noise-amplifies a weak signal of the F2 band. A second filter 370 filters an F2 band signal from a signal output from the second matching unit 340.

A signal processor 380 converts respective frequencies of F1 and F2 signals output from the first and second filters 360 and 370 to output baseband signals, respectively. FIG. 2 shows that the signal processor 380 is configured by an Integrated Circuit (IC) (i.e., a single chip receiver IC for F1 and F2 (T-DMB and S-DMB)) to convert the F1 and F2 signals into respective baseband signals. In this case, the signal processor 380 may include a first band signal processing unit for converting a frequency of the F1 band signal to output a baseband signal and a second band signal processing unit for converting a frequency of the F2 band signal to output a baseband signal. Although an exemplary embodiment of the present invention illustrates that the signal processor 380 is a single IC, corresponding F1 and F2 signal processors may be separately configured.

The signal processor 380 may be configured by a frequency converter for down-converting a frequency of a received RF band signal to output a baseband signal. A demodulator and a decoder may be connected to a next terminal of the signal processor 380 and for processing a corresponding band signal. Meanwhile, the signal processor 380 may include a demodulator and a decoder in addition to the frequency converter.

A T-DMB signal (F1 signal) received through the antenna is filtered by the first band filter 310, impedance of the filtered signal is matched by the first matching unit 330, and the matched signal is input to the signal processor 380 through the first filter 360. Meanwhile, an S-DMB signal (F2 signal) received through the antenna 110 is filtered by a second band filter 320, impedance of the filtered signal is matched by the second matching unit 340, the matched signal is amplified by an amplifier 350, and the amplified signal is input into the signal processor 380 through a second filter 370.

A mobile terminal device having a construction as previously illustrated may select and process an F1 or F2 signal according to selection of the user. This may be implemented by controlling the signal processor 380 using input means 390. If the user selects playback of T-DMB, a controller (not shown) of the terminal device outputs a control signal for selecting the F1 signal to the signal processor 380. Thereafter, the signal processor 380 activates a T-DMB signal processing unit but inactivates an S-DMB signal processing unit. Owing to this, the signal processor 380 converts a frequency of a T-DMB signal in an input signal to output a baseband signal, and demodulates and decodes the baseband signal. If the S-DMB signal is selected, the signal processor 380 may activate the S-DMB signal processing unit to perform the foregoing operation. When both of the T-DMB and the S-DMB are selected, the controller may activate both of a T-DMB signal processing unit and an S-DMB signal processing unit of the signal processor to process two signals.

Because the antenna 100 has structures as illustrated in FIGS. 1B through 1D, a space for installing antennas is easily secured in a mobile terminal device having a construction of FIG. 2. Accordingly, when a user watches DMB, an antenna may be arranged in consideration with a grip of the user. That is, when the second antenna includes at least two antennas for frequency diversity, because the first antenna engages with a first one antenna to implement one antenna, a space for installing the antennas is easily secured.

Figure 3A:
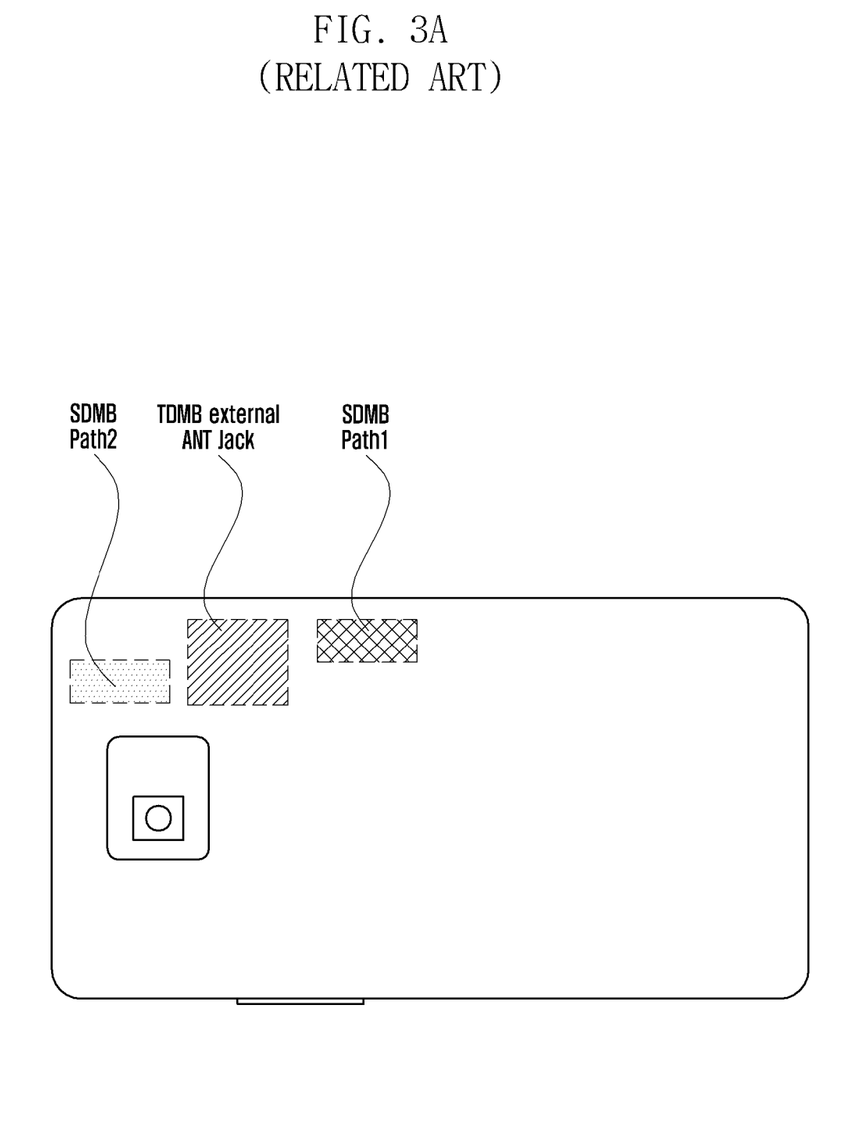
FIGS. 3A, 3C, and 3E illustrate installations of two Satellite-DMB (S-DMB) antennas separate from a Terrestrial-Digital Multimedia Broadcasting (T-DMB) antenna according to the related art.
Figure 3B:
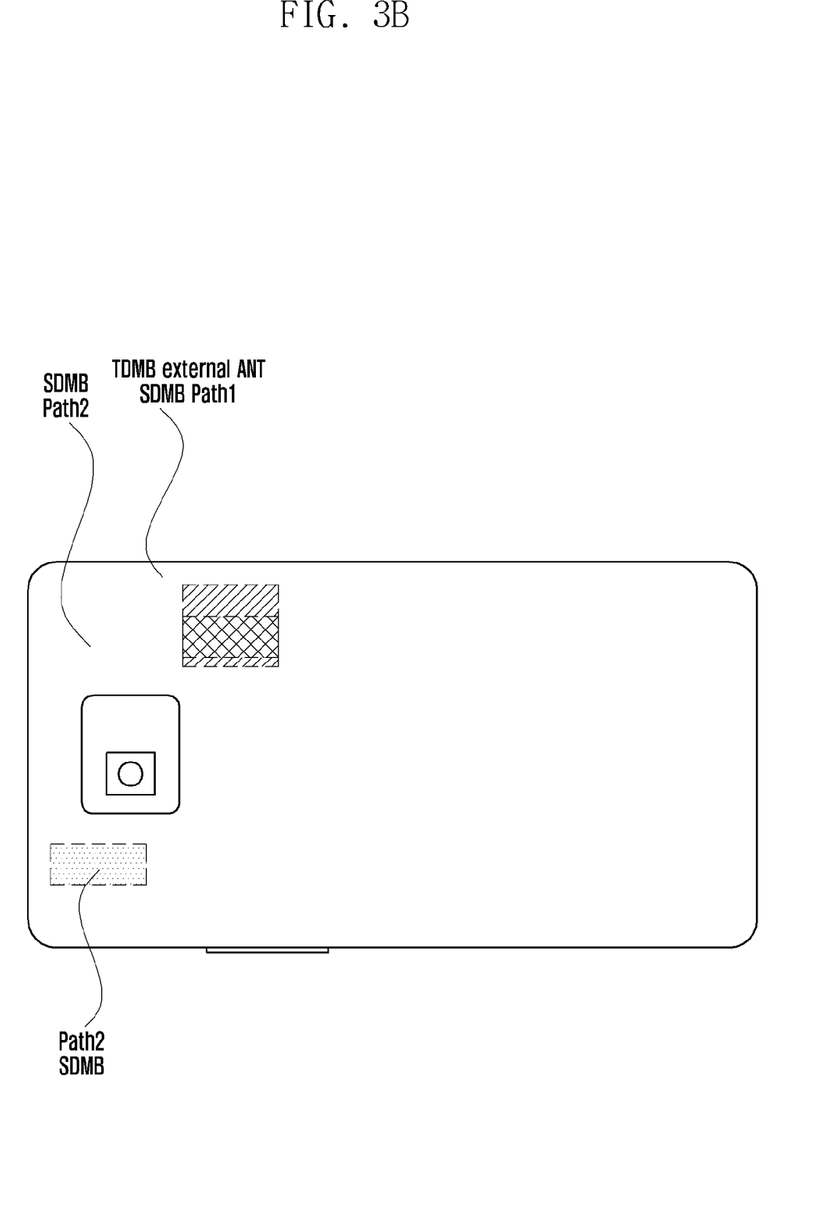
FIGS. 3B, 3D, and 3F illustrate installations of a multiple resonance antenna for receiving T-DMB and S-DMB signals and another S-DMB antenna according to exemplary embodiments of the present invention.
Figure 3C:
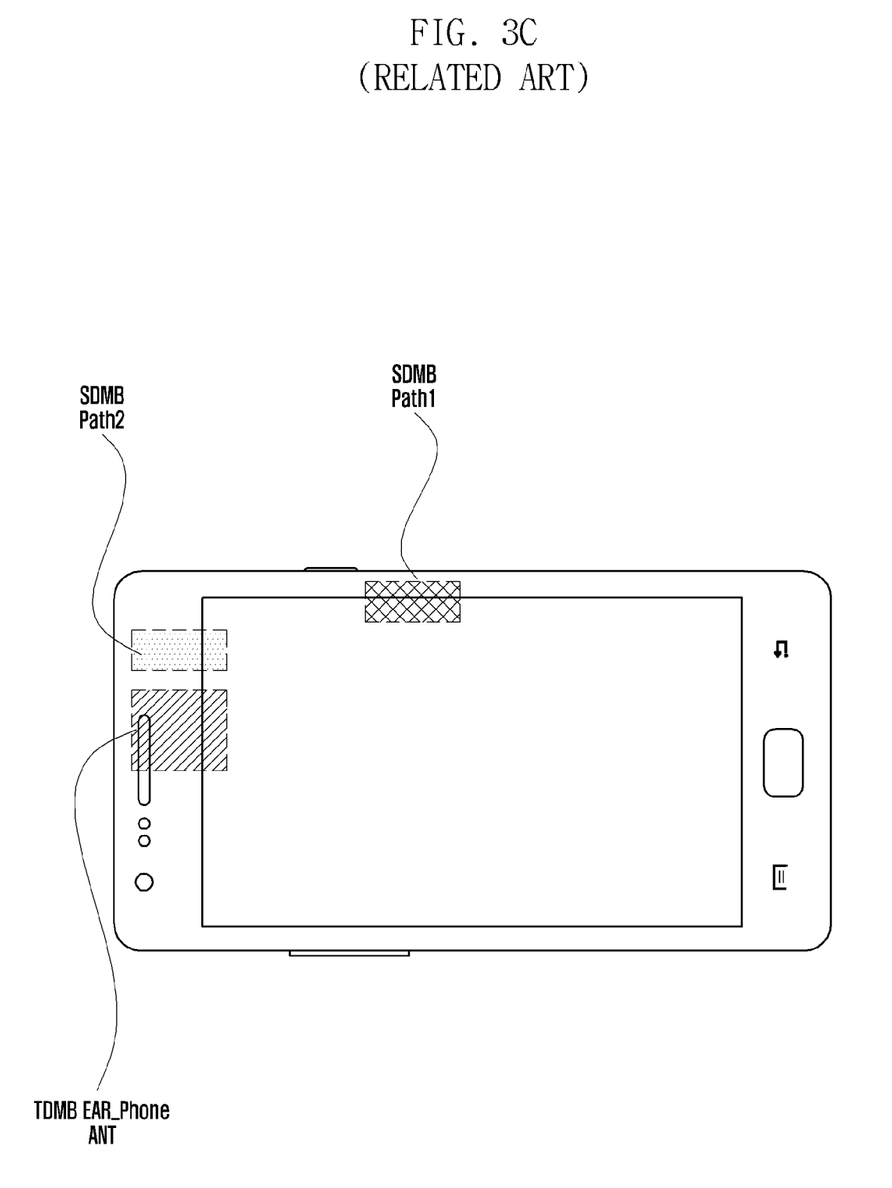
Figure 3D:
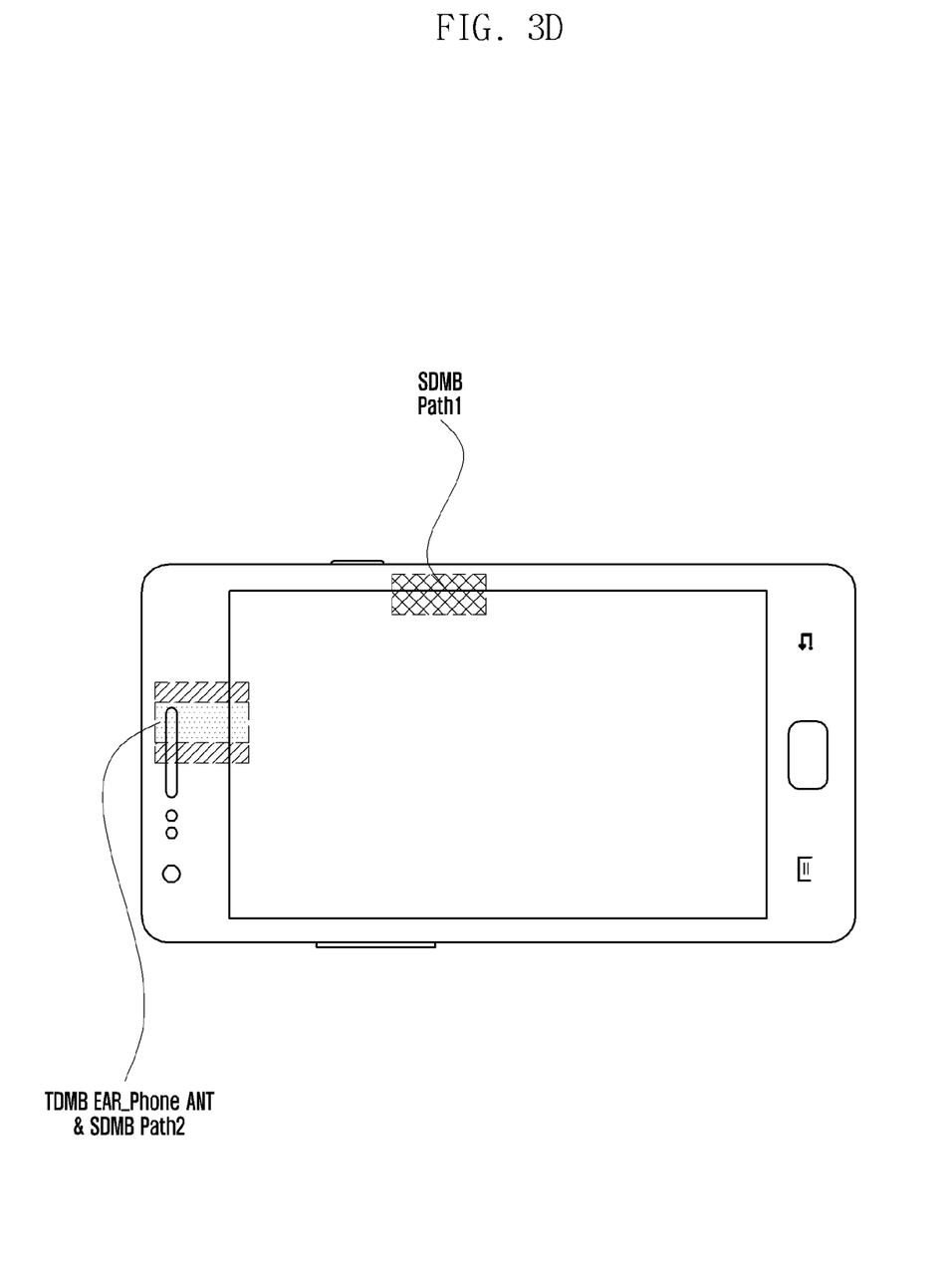
Figure 3E:
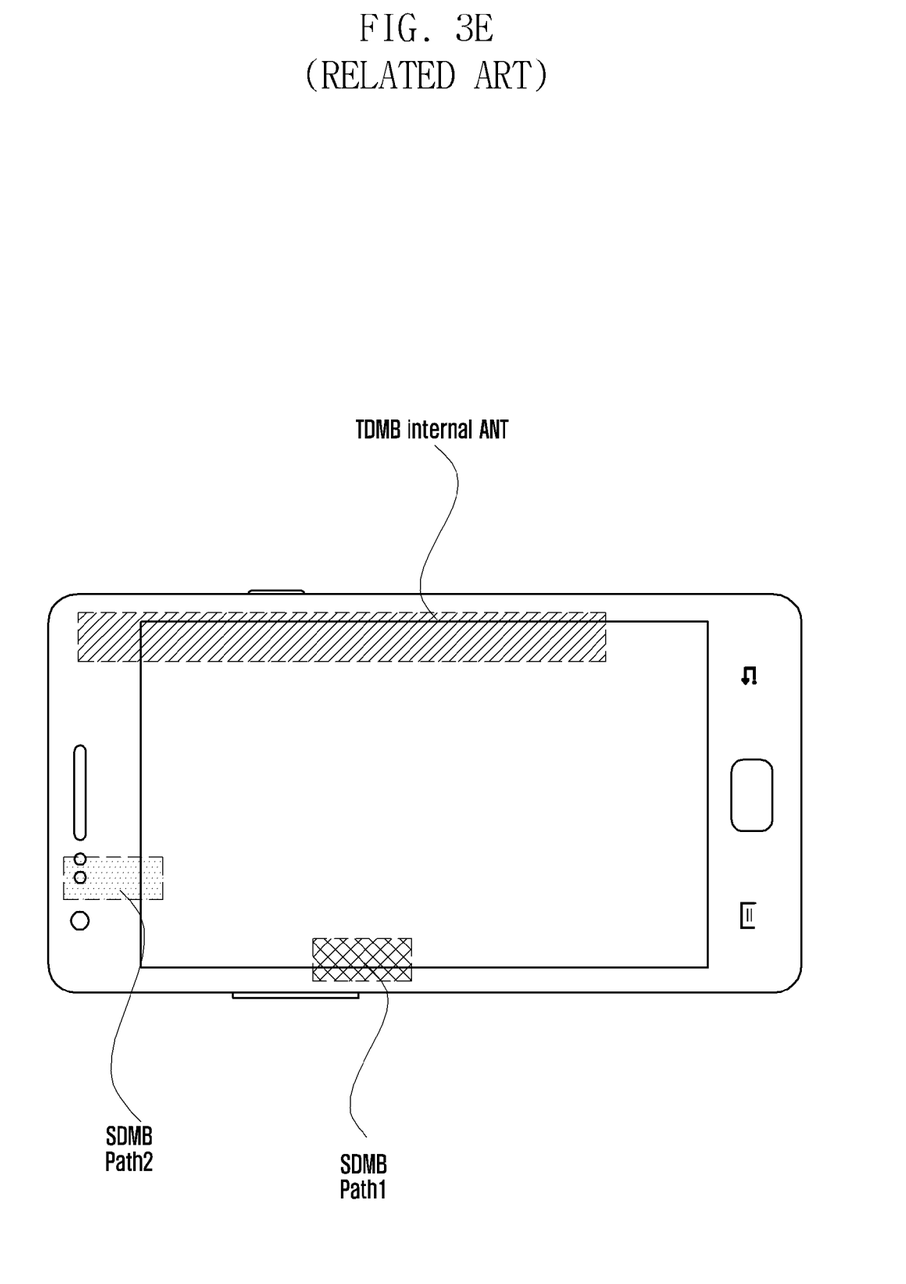
Figure 3F:
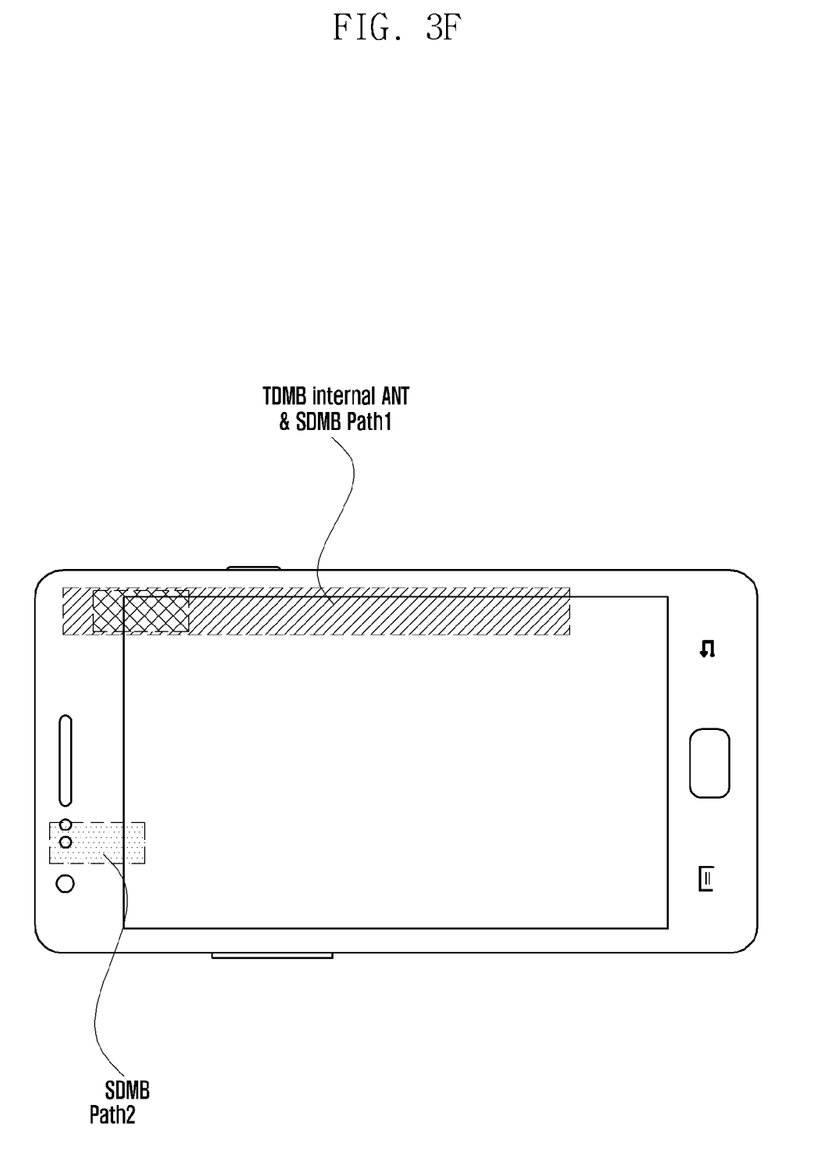

FIGS. 3A, 3C, and 3E illustrate installations of two S-DMB antennas separate from a T-DMB antenna according to the related art, FIGS. 3B, 3D, and 3F illustrate installations of a multiple resonance antenna for receiving T-DMB and S-DMB signals and another S-DMB antenna according to exemplary embodiments of the present invention.

Referring to FIG. 3A, an external antenna of the related art has a structure wherein a T-DMB external antenna jack is installed at a side of the terminal device, and S-DMB antennas are installed at both sides of the terminal device, respectively.

Referring to FIG. 3C, an earphone antenna of the related art has a structure wherein a T-DMB earphone antenna jack is installed at an upper surface of the terminal device and S-DMB antennas are installed at both sides of the terminal device, respectively.

Referring to FIG. 3B, an external antenna has a structure wherein an external antenna jack including a T-DMB antenna and one S-DMB antenna is installed at a side of the terminal device, and remaining S-DMB antennas are installed at another side of the terminal device.

Referring to FIG. 3D, an earphone antenna has a structure wherein an earphone antenna jack including a T-DMB antenna and one S-DMB antenna is installed at an upper side of the terminal device and the S-DMB antenna is installed at a side of the terminal device. Because an antenna arrangement structure, according to an exemplary embodiment of the present invention, may orthogonally arrange an S-DMB antenna, it is appreciated that the antenna arrangement structure is implemented in consideration with performance security of an antenna.

Referring to FIG. 3E, an internal antenna of the related art has a structure wherein a T-DMB internal antenna is installed at a side of the terminal device and S-DMB antennas are installed at another side of the terminal device to be spaced apart from the T-DMB internal antenna by a predefined distance. Accordingly, in a case of FIG. 3E, it reduces receiving efficiency of S-DMB according to a grip of a user.

Referring to FIG. 3F, an internal antenna has a structure wherein an internal antenna integrally configuring T-DMB and S-DMB antennas is installed at a side of a terminal device and another S-DMB antenna is installed at another side of the terminal device. An exemplary embodiment of the present may receive an S-DMB signal without degradation of performance regardless of a grip of the terminal device.

Figure 4:
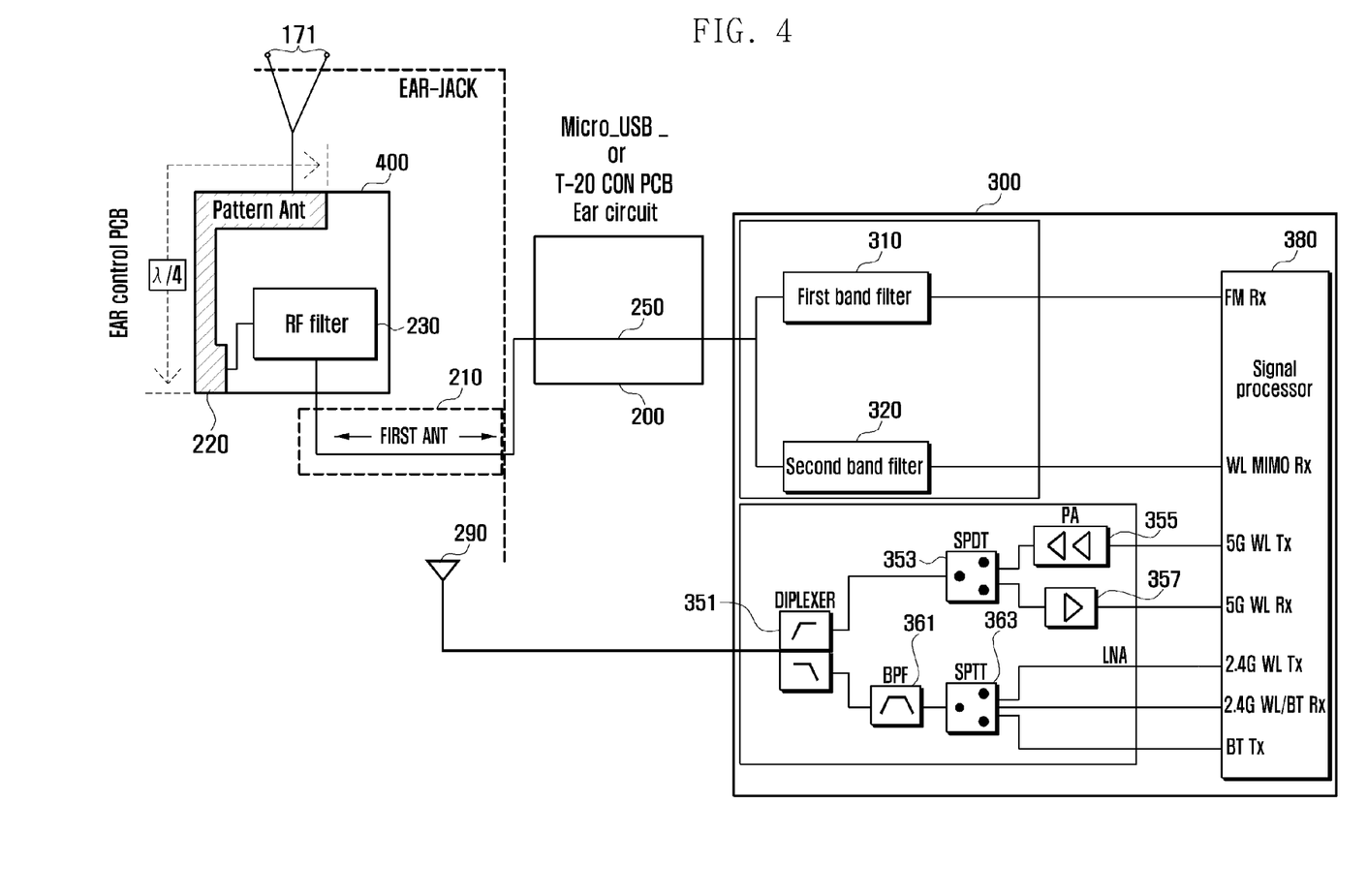
FIG. 4 is a block diagram illustrating a configuration of an earphone device including a multiple resonance antenna and a mobile terminal according to an exemplary embodiment of the present invention.

FIG. 4 is a block diagram illustrating a configuration of an earphone device including a multiple resonance antenna and a mobile terminal according to an exemplary embodiment of the present invention.

Referring to FIG. 4, the multiple resonance antenna may be one of an internal antenna of FIG. 1B, an external antenna of FIG. 1C, and an earphone type multiple resonance antenna of FIG. 1D. Hereinafter, the multiple resonance antenna may be an earphone antenna. Furthermore, the first band may be an FM band signal and the second band is a Wi-Fi band signal. Moreover, the mobile terminal 300 may be a mobile terminal having a MIMO or a MISO function and a multiple input may be a Wi-Fi signal.

A second antenna of a multiple resonance antenna may be mounted in a case including a key, such as a volume controller, of an earphone device. However, when the mobile terminal 300 has a MIMO or a MISO function, the second antenna 220 may operate in the same way as that in an antenna of FIG. 2 included in a connector 200 of the earphone device.

A second antenna 220 is installed in a case 400 located between an earphone 171 and a first antenna 210, and the connector 200 has only structures connecting the earphone antenna device to the mobile terminal In this case, the case 400 may become a volume controller 173 of FIG. 1D. The case 400 has a second antenna 220 and an RF filter 230 therein.

The second antenna 220 connects with an earphone 171. The second antenna 220 receives a Wi-Fi band signal, and a signal received through the second antenna 220 is transferred to an RF filter 230. In this case, the second antenna 220 may be configured in the form of a coil ANT, a wire ANT, or a pattern ANT. The length of the antenna is the λ/4 or λ/2 length of the first antenna 210. FIG. 4 shows an example of a second antenna 220 for receiving the Wi-Fi band signal configured in the form of a pattern.

An RF filter 230 is connected between the second antenna 220 and the first antenna 210, filters a Wi-Fi band signal, but restrains other band signals. The RF filter 230 may be configured by a high pass filer or a band pass filter. Furthermore, the RF filter 230 may be configured by a choke circuit. In this case, the RF filter 230 is designed to have characteristics wherein Z=open in an FM band and Z=50Ω in a Wi-Fi band. Accordingly, the RF filter 230 passes only the Wi-Fi band signal but restrains the FM band signal as an output thereof.

The output of the RF filter 230 is transferred to the first antenna 210. Accordingly, the Wi-Fi signal and the FM signal are transferred to the connector 200. Thereafter, the Wi-Fi signal and the FM signal are transferred to the mobile terminal 300 through a path 250 of the connector 200. In this case, the path 250 may become a PCB pattern as a conductor, which may be implemented by a micro-strip line.

Thereafter, a first band filter 310 of the mobile terminal 300 filters a first band signal (i.e., an FM signal) from a signal received through the first antenna 210, and a second band filter 320 filters a second band signal (i.e., a Wi-Fi signal) received through the second antenna 220. The ESD unit, the matching unit, the amplifiers, and filters described in FIG. 2 are omitted from the illustration of FIG. 4. However, the foregoing constructions and other constructions may be added if necessary.

Furthermore, a main antenna 290 of the mobile terminal performs a function of transmitting/receiving a Wi-Fi signal. A diplexer 351 performs a function of separating a 2.4G Wi-Fi signal from a 5G Wi-Fi signal. A Single Pole Double Throw (SPDT) switch 353 performs switching of transmission and reception signals of 5G Wi-Fi. A Power Amplifier (PA) 355 power-amplifies and outputs a 5G Wi-Fi transmission signal output from the signal processor 380 to the SPDT switch 353. A Low Noise Amplifier (LNA) 357 low-noise amplifies a received 5G Wi-Fi signal and transfers the amplified signal to the signal processor 380. A Band Pass Filter (BPF) 361 connects with the diplexer 351 and band-filters a transmitted and received 2.4G Wi-Fi signal or Bluetooth signal. A Single Pole Triple Throw (SPTT) switch 363 performs a function of switching transmission and reception signals of 2.4G Wi-Fi and a Bluetooth signal.

The signal processor 380 processes the transmitted and received 5G Wi-Fi signal and 2.4G Wi-Fi signal. In this case, the signal processor 380 is configured by one IC capable of processing an FM signal, a Wi-Fi signal including 5G and 2.4G Wi-Fi signal, and a Bluetooth (BT) signal. Furthermore, the signal processor 380 may receive a Wi-Fi signal in a mobile terminal having MIMO and MISO functions through the second antenna 220 and the antenna 290. The signal processor 380 may be configured by a frequency converter for down-converting a frequency of a received RF band signal to output a baseband signal. In this case, a demodulator and a decoder may be connected to a next stage of the signal processor 380 and process a corresponding band signal. Furthermore, the signal processor 380 may include a demodulator and a decoder in addition to the frequency converter. A controller for controlling an overall operation of a mobile terminal is not shown. In an exemplary embodiment of the present invention, the controller 100 detects whether an earphone antenna is connected. When a Wi-Fi receiving function is selected, the controller processes a multiple input function according to whether the multiple resonance antenna is connected. In this case, the multiple resonance antenna may become one of the antennas shown in FIGS. 1B through 1D.

Although FIG. 4 shows constructions of a mobile terminal serving both of a 5G Wi-Fi signal and a 2.4G Wi-Fi signal, only constructions serving only one of a Wi-Fi signal or a 2.4G Wi-Fi signal may be included and implemented.

An operation of receiving multi-input with a MIMO or MISO function in a mobile terminal having a configuration of FIG. 4 will be described. In this case, the multiple resonance antenna may be an earphone antenna, and the MIMO or MISO function may be controlled by a controller (not shown).

If the connector 200 is connected to the mobile terminal, the controller (not shown) detects that an earphone antenna being an external antenna is connected. If a multiple input function is selected in the foregoing state (i.e., if a Wi-Fi receiving function is selected in FIG. 4), the controller determines whether an earphone antenna is connected. If the earphone antenna is connected, the controller demultiplexes multi-inputs of a Wi-Fi signal received from the second antenna through the signal processor 380 and a Wi-Fi signal received from an antenna 290. That is, if multi-outputs occur from a transmission side, the signal processor 380 converts a first input signal received through the antenna 290 and a second input signal received through a second antenna 220 of a multiple resonance antenna into baseband signals, respectively, and the controller demultiplexes the baseband signals to process one input.

A mobile terminal device, according to an exemplary embodiment of the present invention, uses a multiple resonance antenna, and receives and processes a multiple band signal received through the multiple resonance antenna. For example, an exemplary embodiment of the present invention shares an integral antenna, an attaching antenna, and an earphone-antenna for T-DMB with an S-DMB path to implement multiple resonance antennas. Furthermore, a mobile terminal having transmitted and received Wi-Fi wireless data with a MIMO or MISO function transmits and receives a Wi-Fi band frequency set through a main antenna, and processes a Wi-Fi band frequency receiving signal of multiple resonance antennas receiving Wi-Fi band and another band frequencies as a second input.

In this case, the mobile terminal device may reduce the number of antennas for receiving a multiple band signal, and accordingly reduce manufacturing cost. Furthermore, exemplary embodiments of the present invention may reduce the number of antennas in a mobile terminal device and arrange antennas in consideration with a grip of a user. In addition, when using a mobile terminal device, since domestic and overseas antennas are implemented in one mobile terminal or an antenna receiving another function may be implemented by multiple resonance antennas (i.e., TDMB/SDMB, TDMB/GPS, TDMB/BT, Wi-Fi, FM/Wi-Fi, CMMB/GPS, etc.), it may receive various signals through one antenna.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile terminal device comprising:
   a multiple resonance antenna for receiving a first band signal of a low band and a second band signal of a high band;
   a first band filter connecting with the multiple resonance antenna, for filtering the first band signal received through the multiple resonance antenna;
   a second band filter connecting with the multiple resonance antenna, for filtering the second band signal received through the multiple resonance antenna; and
   a signal processor including a first signal processing unit for converting a frequency of the first band signal received from the first band filter to generate a first baseband signal and a second signal processing unit for converting a frequency of the second band signal received from the second band filter to generate a second baseband signal, and for activating a corresponding one of the first and second signal processing units according to selection of a user.

2. The mobile terminal device of claim 1, wherein the multiple resonance antenna includes at least one of an internal antenna, an external antenna, and an earphone-antenna, and comprises a first antenna for receiving the first band signal and a second antenna for receiving the second band signal.

3. The mobile terminal device of claim 2, wherein the earphone-antenna comprises:
   a first antenna connecting with an earphone, configured in the form of a wire separate from an audio line, for receiving a first band signal; and
   a connector connecting the earphone to a terminal device, wherein the connector comprises:
   a Radio Frequency (RF) filter connecting the first antenna, for filtering the first band signal but restraining other band signals; and
   a second antenna, connected between the RF filter and an internal path of the connector connected to the terminal device, for receiving the second band signal.

4. The mobile terminal device of claim 3, wherein the second antenna has a $\lambda/4$ length of the second band signal, and is configured in the form of at least one of a wire, a coil, and a pattern.

5. The mobile terminal device of claim 4, wherein the connector includes at least one of a micro-Universal Serial Bus (USB) and a T20 pin connector.

6. The mobile terminal device of claim 2, wherein the earphone-antenna comprises:
   a case for connecting with an earphone and including a volume controller;
   a first antenna connecting with the case, configured in the form of a wire separate from an audio line, for receiving a first band signal; and
   a connector connecting with the first antenna for connecting the earphone to a terminal device,
   wherein the case comprises:
   a Radio Frequency (RF) filter connecting the first antenna, for filtering the first band signal but restraining other band signals; and
   a second antenna, connected between the RF filter and an internal path of the connector connected to the terminal device, for receiving the second band signal.

7. The mobile terminal device of claim 6, wherein the connector includes at least one of a micro-Universal Serial Bus (USB) and a T20 pin connector.

8. The mobile terminal device of claim 2, wherein the first band signal comprises a Terrestrial Digital Multimedia Broadcasting (T-DMB) band signal, the second band signal comprises a Satellite DMB (S-DMB) band signal, the first antenna receives a T-DMB band signal, and the second antenna receives an S-DMB band signal.

9. The mobile terminal device of claim 8, wherein two antennas are installed at the second antenna and a second remaining one antenna is installed at another side of a terminal device in which the multiple resonance antenna is installed.

10. A mobile terminal device comprising:
a multiple resonance antenna including integrally configured a first antenna for receiving a first band signal of a low band and a second antennas for receiving a second band signal of a high band;
a first band filter connecting with the multiple resonance antenna, for filtering the first band signal received through the multiple resonance antenna;
a second band filter connecting with the multiple resonance antenna, for filtering the second band signal received through the multiple resonance antenna;
a main antenna for receiving the second band signal;
a signal processor for converting a frequency of a second band signal received through the main antenna to generate a baseband signal, for converting a frequency of the first band signal received through the first band filter from the multiple resonance antenna to generate a baseband signal, and for converting a frequency of the second band signal received through the second band filter from the multiple resonance antenna to generate a baseband signal; and
a controller for detecting a connection of the multiple resonance antenna when a multi-input processing function is selected, and for demultiplexing the second band signals generated by the signal processor when the connection of the multiple resonance antenna is detected.

11. The mobile terminal device of claim 10, wherein the multiple resonance antenna includes at least one of an internal antenna, an external antenna, and an earphone-antenna, and comprises a first antenna for receiving the first band signal and a second antenna for receiving the second band signal.

12. The mobile terminal device of claim 11, wherein the earphone-antenna comprises:
a first antenna connecting with an earphone, configured in the form of a wire separate from an audio line, for receiving a first band signal; and
a connector connecting the earphone to a terminal device,
wherein the connector comprises:
a Radio Frequency (RF) filter connecting the first antenna, for filtering the first band signal but restraining other band signals; and
a second antenna, connected between the RF filter and an internal path of the connector connected to the terminal device, for receiving the second band signal.

13. The mobile terminal device of claim 12, wherein the second antenna has a λ/4 length of the second band signal, and is configured in the form of at least one of a wire, a coil, or a pattern.

14. The mobile terminal device of claim 13, wherein the connector includes at least one of a micro-Universal Serial Bus (USB) and a T20 pin connector.

15. The mobile terminal device of claim 14, wherein the second band signal comprises a Wireless Fidelity (Wi-Fi) band signal.

16. The mobile terminal device of claim 11, wherein the earphone-antenna comprises:
a case connecting with an earphone and including a volume controller;
a first antenna connecting with the case, configured in the form of a wire separate from an audio line, for receiving a first band signal; and
a connector connecting with the first antenna for connecting the earphone to a terminal device,
wherein the case comprises:
a Radio Frequency (RF) filter connecting the first antenna, for filtering the first band signal but restraining other band signals; and
a second antenna, connected between the RF filter and an internal path of the connector connected to the terminal device, for receiving the second band signal.

17. The mobile terminal device of claim 16, wherein the connector includes at least one of a micro-Universal Serial Bus (USB) and a T20 pin connector.

18. The mobile terminal device of claim 17, wherein the second band signal comprises a Wireless Fidelity (Wi-Fi) band signal.

* * * * *